US008136996B2

(12) United States Patent
Lemmers

(10) Patent No.: US 8,136,996 B2
(45) Date of Patent: Mar. 20, 2012

(54) FRUSTOCONICAL BALL BEARING AND PRELOADED BALL BEARING ASSEMBLIES

(75) Inventor: Glenn C. Lemmers, Loves Park, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 886 days.

(21) Appl. No.: 12/072,199

(22) Filed: Feb. 25, 2008

(65) Prior Publication Data

US 2009/0214148 A1    Aug. 27, 2009

(51) Int. Cl.
*F16C 33/66* (2006.01)
*F16C 43/00* (2006.01)

(52) U.S. Cl. ........................... 384/517; 384/538

(58) Field of Classification Search ............... 384/510, 384/514, 517–519, 535–538, 559, 563, 581, 384/582, 584, 585
See application file for complete search history.

(56) References Cited

U.S. PATENT DOCUMENTS

| 851,419 | A | | 4/1907 | Hess |
| 1,811,679 | A | * | 6/1931 | Volet ........................... 384/538 |
| 1,957,062 | A | | 1/1934 | Graham |
| 2,147,787 | A | | 2/1939 | Ferguson |
| 3,001,839 | A | * | 9/1961 | Horberg ........................ 384/518 |
| 3,799,635 | A | | 3/1974 | Worrix |
| 4,173,376 | A | | 11/1979 | Standing et al. |
| 4,462,608 | A | | 7/1984 | Lederman |
| 4,541,742 | A | | 9/1985 | Lederman |
| 4,603,983 | A | | 8/1986 | Hofmann et al. |
| 4,606,658 | A | | 8/1986 | Hofmann et al. |
| 4,741,632 | A | | 5/1988 | Jacobson |
| 5,000,589 | A | * | 3/1991 | Ogata et al. .................... 384/611 |
| 5,174,662 | A | * | 12/1992 | Harvey ........................ 384/611 |
| 5,655,848 | A | | 8/1997 | Catron |
| 5,768,060 | A | | 6/1998 | Albrecht et al. |
| 5,826,987 | A | * | 10/1998 | Beaman ........................ 384/517 |
| 5,868,503 | A | | 2/1999 | Bade |
| 6,877,901 | B2 | | 4/2005 | Wollenweber |
| 7,021,831 | B2 | | 4/2006 | Chadwick et al. |
| 7,287,911 | B2 | | 10/2007 | Dodoro et al. |
| 2006/0181168 | A1 | * | 8/2006 | Hargraves et al. .............. 310/90 |

OTHER PUBLICATIONS

Official Search Report and Written Opinion of the EP Patent Office in counterpart foreign Application No. 09250499 filed Feb. 25, 2008, Opinion dated Jun. 10, 2009.

* cited by examiner

*Primary Examiner* — James Pilkington
(74) *Attorney, Agent, or Firm* — Kinney & Lange, P.A.

(57) ABSTRACT

A ball bearing for interconnecting a rotor to a stator has a plurality of balls and an inner and outer race. The inner race and the outer race have an interior surface configured to movably engage a portion of the balls, and at least one of the inner race and outer race includes a frustoconical exterior surface.

9 Claims, 5 Drawing Sheets

FRUSTOCONICAL BALL BEARING AND PRELOADED BALL BEARING ASSEMBLIES

BACKGROUND

The present invention relates to ball bearings, and to axially preloaded ball bearing assemblies supporting a rotating element.

Ball bearings are used to permit constrained relative motion between a rotational element and a stator element. Ball bearings are used, for example, in: turbines, jet engines, dentistry equipment, bicycles, and automobile axles. Ball bearings may be used in virtually every mechanical assembly that utilizes a part rotating inside a housing.

Conventional ball bearings include a plurality of balls arrayed inside an arcuate allow the balls to rotationally move relative to the surfaces. One exterior surface of the arcuate race interfaces with and is secured to a surface of the rotating element, and another exterior surface interfaces with and is engaged by an arcuate surface of the stator element.

The race is generally comprised of an outer race and an inner race. During installation of one of the more common ball bearing assemblies, the inner race is press fit to the rotating element. This press fit secures the assembled ball bearing to the rotating element. A radial clearance is used to slip the stator element over a portion of the rotating element and slide the stator element onto and over the exterior surface of the outer race. The radial clearance used in assembly is generally not eliminated by press fitting the outer race to the stator element after installation. Both races are generally not press fit because the ball bearings would be too stiff to survive impact in applications where impact forces are applied to the mechanical assembly. Stiff ball bearings are more likely to irreparably separate on impact, most likely irreparably damaging the assembly. Thus, to reduce the stiffness of the ball bearings, the outer race is not press fit, and the radial clearance is allowed to remain between the outer race and the stator element.

The remaining radial clearance, however, allows for relative movement between the surface of the stator element and the exterior surface of the outer race. This relative movement or "fronting problem" leads to increased wear and decreased part durability. The clearance also provides additional space between the rotating element and the stator element in which the rotating element may rotate eccentrically in. The greater the size of the eccentric rotation of the rotating element about its axis of rotation the greater the radial force generated by the rotating element. The larger radial force increases the radial load on the ball bearings, further increasing component wear.

Thus, there is a need for a ball bearing that is not too stiff, yet is capable of reducing or eliminating the remaining radial clearance between the surface of the ball bearing and the surface of the stator element.

SUMMARY

In one aspect, a ball bearing for interconnecting a rotor to a stator has a plurality of balls and an inner and outer race. The inner race and the outer race have an interior surface configured to movably engage a portion of the balls, and at least one of the inner race and outer race includes a frustoconical exterior surface.

In another aspect, an axially preloaded bearing assembly for interconnecting a rotor with a stator has a first and second ball bearing and a preload mechanism. The first ball bearing and the second ball bearing are secured to different portions of the rotor. The preload mechanism is disposed adjacent the first ball bearing and is adapted to apply an axial preload force to the first ball bearing. The stator and the second ball bearing are configured with frustoconical surfaces, which firmly abut each other to transfer a portion of the axial preload force to a radial preload force.

DETAILED DESCRIPTION

Figure 1:
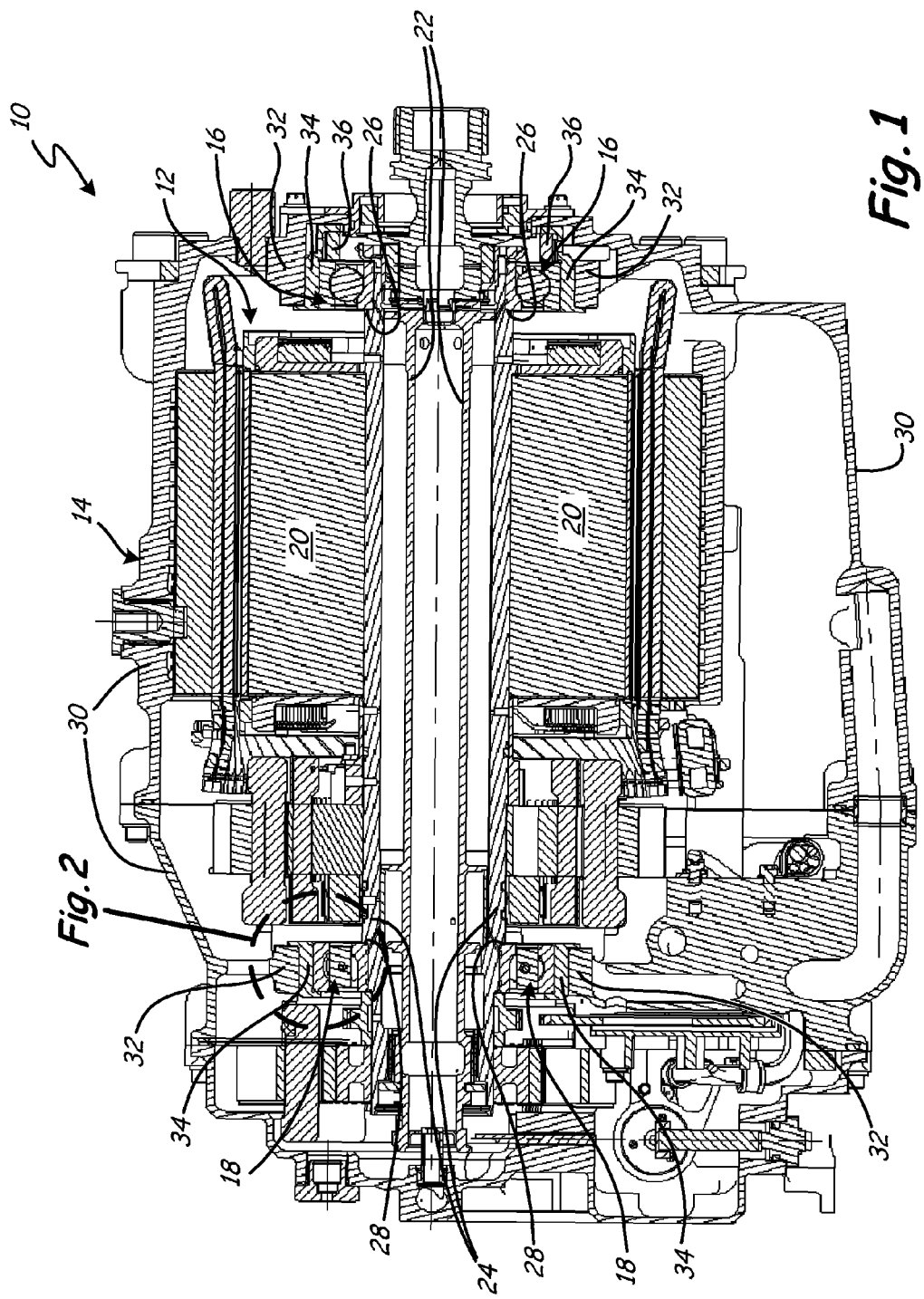
FIG. 1 is a cross sectional view of a ball bearing assembly in accordance with the present invention.

FIG. 1 shows a cross section of a ball bearing assembly inside an industrial machine, such as a variable frequency starter generator 10 used in aeronautical applications. The generator 10 is comprised of a rotating element (rotor) 12 and a stationary element (stator) 14, a first ball bearing 16, and a second ball bearing 18. The rotor 12 further includes radial component 20, an inner shaft 22, an outer shaft 24, a first annular shoulder 26, and a second annular shoulder 28. The stator 14 includes a segmented housing liner 30, a bearing support structure 32, a bearing liner 34, and a preload mechanism 36.

In the generator 10 shown in FIG. 1, the components of the rotor 12 are arrayed radially about the inner shaft 22. The inner shaft 22 has portions that extend radially to interconnect with outer shaft 24. The outer shaft 24 radially interconnects to the other components of the rotor 12, including the radial component 20. The outer shaft 24 is configured such that the first ball bearing 16, and the second ball bearing 18 may be secured to it. In the embodiment shown, the inner shaft 22 and the outer shaft 24 extend axially from a first end surface to a second end surface of the segmented housing liner 30. In other embodiments, the shafts 22, 24 may extend through the interior of the segmented housing liner 30.

As shown in FIG. 1, the first ball bearing 16, and the second ball bearing 18 are secured to the outer shaft 24. In one embodiment, the arcuate inner diameter surfaces of the ball bearings 16, 18 are press fit or adhesively bonded to the shaft 24. The arcuate outer diameter surface of the bearings 16, 18 interfaces with and is engaged by an arcuate surface of the bearing liner 34 radially inwards of the segmented housing liner 30. The bearings 16, 18 may be full bearings or partial interconnected bearings. Although only two bearings are shown in FIG. 1, multiple bearings may be used to interconnect the rotor 12 and the stator 14. The bearings 16, 18 bear the radial load of the rotor 12 and permit constrained relative motion between the rotor 12 and the stator 14.

In FIG. 1, the bearing liner 34 interconnects with the preload mechanism 36. In one embodiment, the preload mechanism 36 is a spring. In other embodiments, preloading methods such as rigid preloading, clamping preloading or thrust application preloading may be used in lieu of a preload mechanism. Likewise, although angular contact ball bearings are utilized in the embodiment illustrated in FIG. 1, any ball bearing capable of axial preloading may be used in the invention.

As shown in FIG. 1, the preload mechanism 36 is disposed axially abutting a portion of the exterior surface of the first ball bearing 16. The preload mechanism 36 exerts an axial force on a portion of the exterior surface of the first ball bearing 16. This axial force is transferred through the first ball bearing 16 into the outer shaft 24 via the first annular shoulder 26, which abuts a portion of the exterior surface of the first ball bearing 16. The outer shaft 24 transfers the axial force to a portion of the second ball bearing 18 via the abutting second annular shoulder 28. As will be discussed in greater detail in subsequent portions of the application, the axial force transferred to the second ball bearing 18 is transferred into a radial force as well as an axial force. In the embodiment shown in FIG. 1, the radial force urges the second ball bearing 18 radially toward the surface of the stator 14. This radial force reduces or eliminates (by creating an interference fit) the clearance between the exterior surface of the second ball bearing 18 and the bearing liner 34 (i.e. the portion of the stator 14 interfacing the bearing 18).

The reduction or elimination of the clearance between the second ball bearing 18 and the bearing liner 34 results in reduced relative movement between the surface of the bearing liner 34 and the exterior surface of the second ball bearing 18. The reduced relative movement between the surfaces decreases component wear, and increases the durability of the ball bearing 18. The reduction in or elimination of the clearance also reduces the radial space the rotor 12 has to rotate eccentrically in. This decrease in space decreases the size of the rotor's eccentric rotation. The decrease in eccentric rotation reduces the radial force generated by the rotor 12. This decrease in radial force decreases the radial load on the ball bearings 16, 18, and thus reduces the likelihood of component wear.

Figure 2:
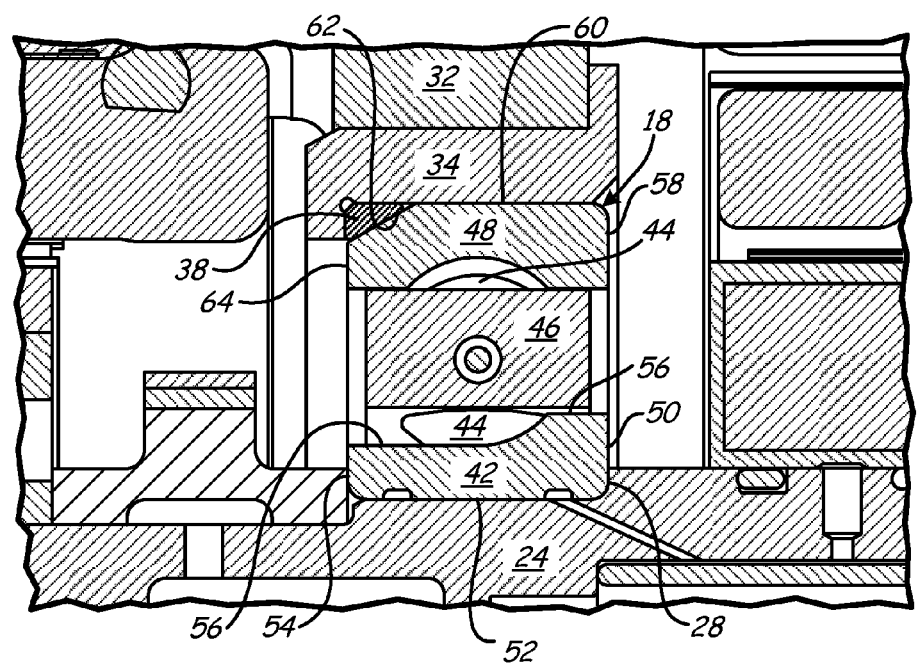
FIG. 2 is an enlarged cross sectional view from FIG. 1 illustrating one embodiment of the ball bearing.

FIG. 2 illustrates an enlarged cross section of the second ball bearing 18, and partial cross section of the outer shaft 24 and bearing liner 34. In the embodiment shown, a wedge collar 38 is sandwiched between the bearing support structure 32 and the second ball bearing 18. The second ball bearing 18 includes an inner race 42, balls 44, a bearing cage 46, and an outer race 48. The inner race 42 includes a first end surface 50, an inner surface 52, a second end surface 54, and an outer surface 56. The outer race 48 is comprised of a first end surface 58, an outer surface 60, a frustoconical surface 62, a second end surface 64, and an inner surface 60.

In the embodiment shown in FIG. 2, the inner surface 52 of the inner race 42 is secured to the outer shaft 24. A first end surface 50 forms a generally perpendicular angle with the inner surface 52. A portion of the first end surface 50 abuts the second annular shoulder 28. The second annular shoulder 28 transfers the preload force to the first end surface 50. In one embodiment, the second annular shoulder 28 is configured to aid the second ball bearing 18 in engaging the shaft 24. The first end surface 50 forms a generally perpendicular angle with the inner diameter surface 56. The inner diameter surface 56 is configured to movably engage an inner diameter portion of the balls 44 as the inner race 42 rotates with the shaft 24. The inner diameter surface 56 forms a generally perpendicular angle with the second end surface 54. The second end surface 54 forms a generally perpendicular angle with the inner surface 52.

The balls 44 movably interconnect the inner race 42 to the outer race 48. More specifically, portions of the balls 44 movably engage and transfer force between the inner diameter surface 56 of the inner race 42 and the inner surface 60 of the outer race 48. Depending on the application, the balls 44 may be surrounded by the bearing cage 46 such as the one illustrated in FIG. 2. The bearing cage 46 allows the balls 44 to be spread symmetrically between the inner diameter surface 56 and the inner surface 60. This symmetric arrangement distributes radial and axial load more proportionately from the inner race 42 to the outer race 48.

The inner surface 60 of the outer race 48 is configured to movably engage an outer diameter portion of the balls 44. The inner surface 60 forms a generally perpendicular angle with the first end surface 58. The first end surface 58 forms a generally perpendicular angle to the outer surface 60. The outer surface 60 extends generally parallel to the axis of rotation of the rotor 12. In one embodiment, the outer surface 60 also extends generally parallel to an inner diameter surface of the bearing liner 34. In one embodiment, the outer surface 60 interfaces with and is engaged by the inner diameter surface of the bearing liner 34. In one embodiment, the outer surface 60 is in abutting interference engagement with the inner diameter surface of the bearing liner 34. In the one embodiment illustrated in FIG. 2, the outer surface 60 forms an angle of less than 90 degrees with the frustoconical surface 62, and the frustoconical surface 62 forms an angle of less than 90 degrees with the second end surface 64. In one embodiment, the frustoconical surface 62 extends at a diagonal angle to the axis of rotation of the rotor 12. In FIG. 2, the frustoconical surface 62 is configured to engage and abut a corresponding frustoconical surface on the wedge collar 38. In other embodiments, the wedge collar 38 is used in a plurality of bearings in an assembly. In one embodiment, the wedge collar 38 is used in the first ball bearing 16 in addition to the second 18.

The angle that the frustoconical surface 62 forms with the outer surface 60 and the second end surface 64 may vary based on the application of the assembly and the material(s) used in the components. The angle of the frustoconical surface on the wedge collar 38 will also vary depending on the application of the assembly and the material(s) used in the components. If the assembly is subject to an application where impact force is applied to the bearings, the angles of the frustoconical surfaces should be decreased to allow for movement of the outer race 48 relative to the wedge collar 38 and the bearing liner 34. This movement keeps the bearing 18 from being irreparably separated by the impact force. Movement generally may be achieved if the angle on the wedge collar 38 (the angle measured between the surface of the wedge collar 38 abutting the bearing liner 34 and the frustoconical surface of the wedge collar) in radians is greater than twice the tangent of the coefficient friction ($\mu_s$). The coefficient of friction $\mu_s$ is determined by the materials that comprise the wedge collar 38 and the second ball bearing 18. In applications that are not subject to impact forces, a larger wedge collar 38 angle (and a larger interconnection angle between the outer surface 60 and the frustoconical surface 62) may be used.

The engagement of the frustoconical surface 62 and the frustoconical surface of the wedge collar 38 transfers a portion of the axial preload force to a radial force. The radial force urges the outer race 48 radially toward the inner diameter surface of the bearing liner 34 reducing or eliminating clearances between the surfaces.

In the one embodiment, the bearing liner 34 is configured to engage the wedge collar 38 and the inner race 48. In one embodiment, the bearing liner 34 is press fit to the wedge collar 38 and the outer race 48. In another embodiment, the bearing support structure 32 may be press fit or adhesively bonded only to the wedge collar 38. In another embodiment, the wedge collar 38 is press fit to neither the outer face 48 nor the wedge collar 38. The bearing liner 34 extends axially along the ball bearing 18 and the wedge collar 38, and extends radially to interconnect with the bearing support structure 32.

Figure 3:
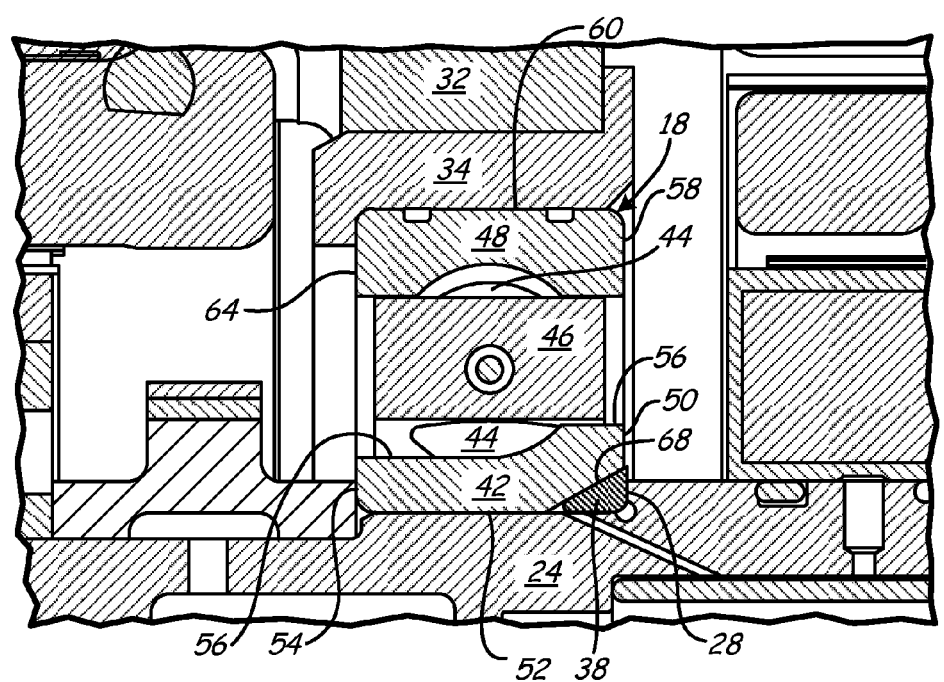
FIG. 3 is an enlarged cross sectional view of another embodiment of the ball bearing.

FIG. 3 illustrates a cross section of another embodiment of the second ball bearing 18. In FIG. 3, the wedge collar 38 is disposed in a location abutting the shaft 24. The inner race 42 is configured with a frustoconical surface 68 between the inner surface 52 to the first end surface 50. In one embodiment, the frustoconical surface 68 extends at a diagonal angle to the axis of rotation of the rotor 12. The frustoconical surface 68 is configured to engage and abut a corresponding frustoconical surface on the wedge collar 38. In other embodiments, the bearing support structure 32 may be radially disposed on the shaft 24 radially inwards of the inner race 42 and wedge collar 38. If disposed in such a manner, the bearing liner 34 may be press fit to the surface(s) of the outer race 48, and the inner race 42 may have radial clearance to the outer shaft 24.

Figure 4:
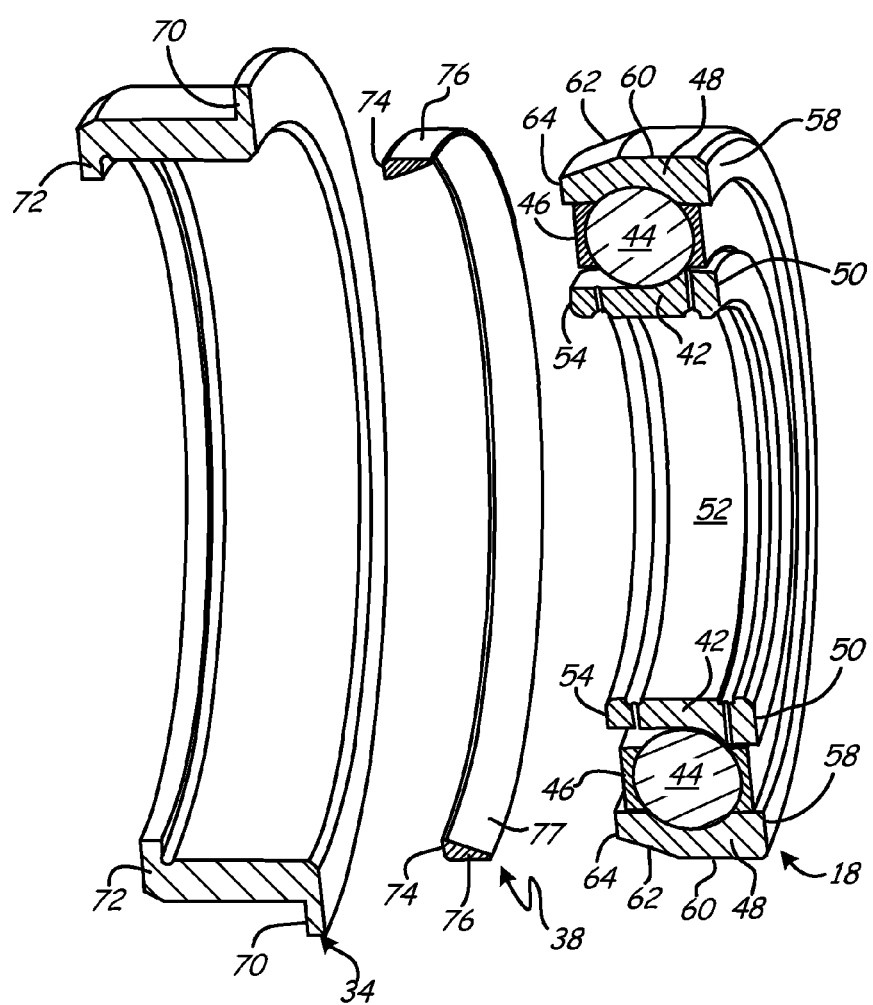
FIG. 4 is an exploded sectional perspective view of the ball bearing, wedge collar, and bearing support structure of FIG. 2.

FIG. 4 shows an exploded sectional perspective view of embodiments of the second ball bearing 18, the wedge collar 38 and bearing liner 34. The bearing support structure 32 includes a first radial lip 70 and a second radial lip 72. The wedge collar 38 includes a radial side surface 74, an axial side surface 76, and a frustoconical surface 77.

When assembled the radial side surface 74 of the wedge collar 38 is disposed abutting the second radial lip 72. The second ball bearing 18 is disposed interfacing the inner diameter surface of the bearing liner 34 such that the frustoconical surface 62 abuts the frustoconical surface 77 of the wedge collar 38.

In FIG. 4, the first radial lip 70 on the bearing liner 34 aids in engaging a portion of the bearing support structure 32 (FIGS. 1-3). The first radial lip 70 is configured to restrain the bearing liner 34 from leftward axial movement in FIG. 4. The second radial lip 72 engages the radial side surface 74 of the wedge collar 38. The second radial lip 72 restrains the wedge collar 38 from leftward axial movement in FIG. 4. In one embodiment, the second ball bearing 18 restrains the wedge collar 38 from rightward axial movement and inward radial movement in FIG. 4. The inner diameter surface of the bearing liner 34 contacts the axial side surface 76 to restrain the wedge collar 38 from outward radial movement. Thus, in one embodiment the wedge collar 38 is restrained from movement in the axial and radial directions. Likewise, the wedge collar 38 and bearing liner 34 restrain the second ball bearing 18 from radial movement.

Figure 5:
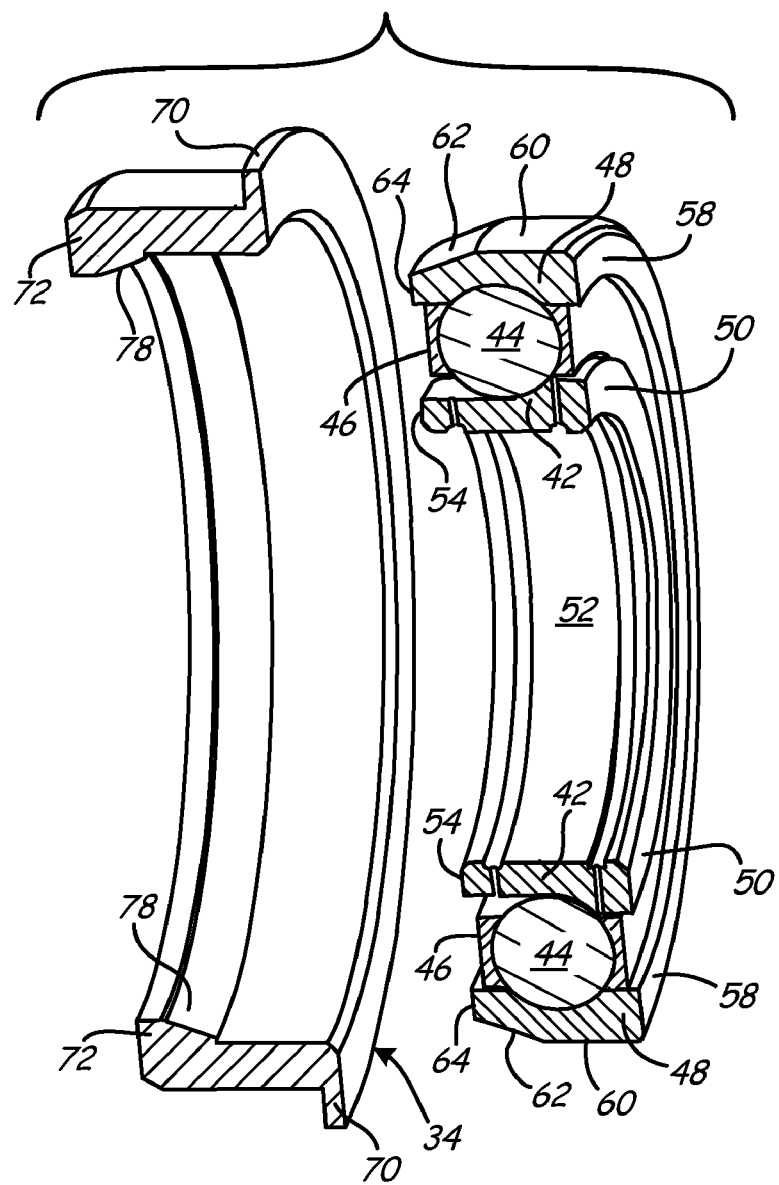
FIG. 5 is an exploded sectional perspective view of another embodiment of the bearing support structure with the ball bearing embodiment of FIG. 4.

FIG. 5 shows an exploded perspective view of another embodiment of the second ball bearing 18 and bearing liner 34. In this embodiment, the inner diameter surface of the bearing liner 34 interconnecting with the second radial lip 72 is configured with a frustoconical surface 78 that corresponds to the frustoconical surface 62 on the second ball bearing 18. When assembled, the second ball bearing 18 is disposed interfacing the inner diameter surface of the bearing liner 34, and the frustoconical surface 62 of the ball bearing 18 abuts the frustoconical surface 78 of the liner 34. This configuration restrains the second ball bearing 18 from radial movement.

Although the present invention has been described with reference to preferred embodiments, workers skilled in the art will recognize that changes may be made in form and detail without departing from the spirit and scope of the invention.

The invention claimed is:

1. An axially preloaded bearing assembly for interconnecting a rotor with a stator, the bearing assembly comprising:
   a preload mechanism;
   first and second ball bearings configured to be mounted to different portions of the stator and adapted to be secured to different portions of the rotor, at least one of the first and second ball bearings including a linear section and a conical section having a frustoconical surface, wherein the rotor is configured to transfer an axial preload force exerted by the preload mechanism on the first ball bearing to the second ball bearing, and wherein the frustoconical surface transfers the axial preload force to a radial force; and
   the stator including a linear section and a conical section with a frustoconical surface, the frustroconical surface of the stator interfacing with the frustoconical surface of the at least one of the first and second ball bearings;
   wherein the radial force on the frustoconical surface of the conical section of the at least one of the first and second ball bearings creates an interference fit between a surface of the linear section of the at least one of the first and second ball bearings and an interfacing surface of the linear section of the stator which reduces or eliminates a clearance therebetween.

2. The bearing assembly of claim 1, wherein preload mechanism comprises a spring.

3. The bearing assembly of claim 1, wherein the frustoconical surface of the stator comprises a surface of a bearing liner.

4. The bearing assembly of claim 1, wherein the stator includes a wedge collar configured with the frustoconical surface.

5. An axially preloaded bearing assembly for interconnecting a rotor with a stator, the bearing assembly comprising:
   a first ball bearing and a second ball bearing configured to be secured to different portions of the rotor;
   a preload mechanism disposed adjacent the first ball bearing and adapted to apply an axial preload force thereto;
   the stator including a linear section and a conical section and the second ball bearing including a linear section and a conical section, wherein the conical section of the second ball bearing is configured with a frustoconical surface which firmly abuts a frustoconical surface of the conical section of the stator to transfer a portion of the axial preload force to a radial preload force and thereby engage adjacent interfacing surfaces of the linear section of the stator and the linear section of the second ball bearing in an interference fit that reduces or eliminates clearances therebetween.

6. The bearing assembly of claim 5, wherein the rotor transfers the axial preload force from the first ball bearing to the second ball bearing.

7. The bearing assembly of claim 5, wherein the preload mechanism comprises a spring.

8. The bearing assembly of claim 5, wherein the stator includes a wedge collar configured with the frustoconical surface which firmly abuts the frustoconical surface of the second ball bearing.

9. The bearing assembly of claim 5, wherein the frustoconical surface of the stator comprises a surface of a bearing liner.

* * * * *

UNITED STATES PATENT AND TRADEMARK OFFICE
CERTIFICATE OF CORRECTION

| | | |
|---|---|---|
| PATENT NO. | : 8,136,996 B2 | Page 1 of 1 |
| APPLICATION NO. | : 12/072199 | |
| DATED | : March 20, 2012 | |
| INVENTOR(S) | : Glenn C. Lemmers | |

It is certified that error appears in the above-identified patent and that said Letters Patent is hereby corrected as shown below:

In the Specifications:

Col. 1, Line 16

Insert --race. The interior surfaces of the race are configured to engage the balls and are configured to-- after "arcuate"

Signed and Sealed this
Twenty-fourth Day of July, 2012

David J. Kappos
*Director of the United States Patent and Trademark Office*